Figure 1:
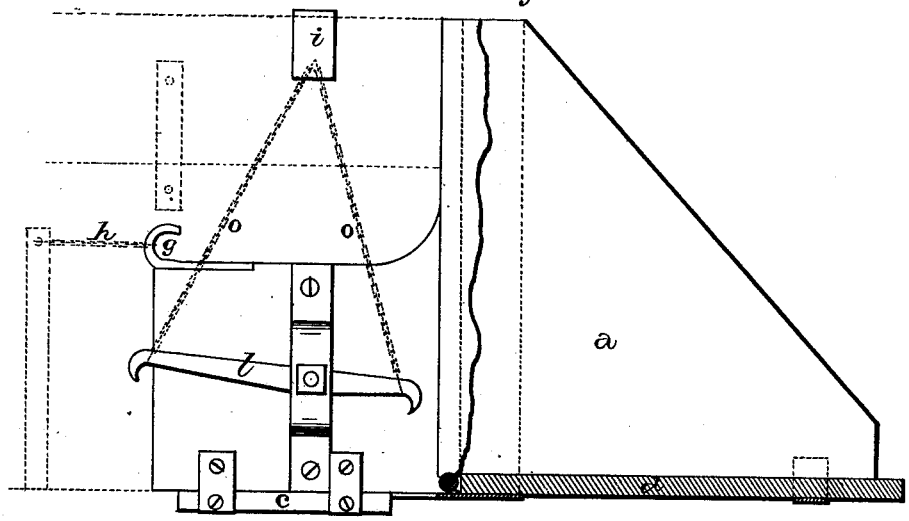
Figure 2:
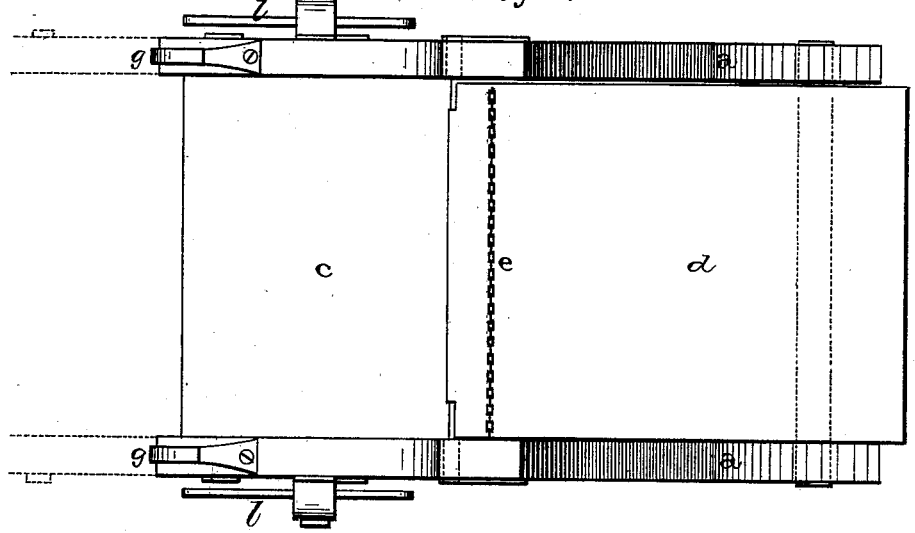

T. STEVENS.
END-BOARDS FOR WAGONS.

No. 190,791. Patented May 15, 1877.

WITNESSES.

INVENTOR
Thos. Stevens
per
F. A. Lehmann, Atty.

UNITED STATES PATENT OFFICE.

THOMAS STEVENS, OF CAMERON, MISSOURI.

IMPROVEMENT IN END-BOARDS FOR WAGONS.

Specification forming part of Letters Patent No. 190,791, dated May 15, 1877; application filed April 16, 1877.

*To all whom it may concern:*

Be it known that I, THOMAS STEVENS, of Cameron, in the county of Clinton and State of Missouri, have invented certain new and useful Improvements in End-Boards for Wagons; and I do hereby declare the following to be a full, clear, and exact description of the invention, such as will enable others skilled in the art to which it pertains to make and use it, reference being had to the accompanying drawings, which form part of this specification.

My invention relates to an improved end-gate for wagons; and it consists in the arrangement and combination of parts, that will be more fully described hereinafter, whereby an addition is made to the end of the wagon-bed, so as to form a standing-place for a man in shoveling out grain and other such articles.

The accompanying drawings represent my invention.

*a* represents the two sides, which are united together at their front ends by a cross board or bar, *c*, and between which is pivoted or hinged the gate *d*, which raises and closes like a trap-door. When raised upward the gate forms the tail-board of the wagon, and is held in this position by means of a chain, *e*, or other equivalent device. When lowered, this gate forms an extension to the floor of the wagon-bed, and upon which a man stands to shovel out the load.

In order to attach my invention to a wagon-bed the end of the bed is inserted into the front end of the two sides, and then the hooks *g* on the front ends of the two sides are fastened to the tops of the wagon-standards by means of the chains *h*. Over the top edges of the side-boards of the wagon-bed are passed the square hooks *i*, each one of which has two chains, *o*, fastened to it. One of these chains is fastened to one end of the lever *l*, that is pivoted upon the side *a*, and the other chain is fastened to the other end of the lever. When the chains *h o* are drawn up tightly the end-gate is secured to the end of the wagon-bed securely enough to stand the weight of a man upon it. Where an end-gate like this is not used, in order to unload corn in the ear, a large part of the load has to be thrown out with the hands before the scoop-shovel can be used, and this usually takes about as long as to unload the balance. Where a tail-board like mine is used the scoop can be used from the very first.

Having thus described my invention, I claim—

1. The combination of the sides *a*, gate *d*, hooks *g*, and chains *h*, substantially as shown.

2. The combination of the sides *a*, gate *d*, hooks *i*, chains *o*, and lever *l*, substantially as described.

In testimony that I claim the foregoing I have hereunto set my hand this 3d day of April, 1877.

THOMAS STEVENS.

Witnesses:
   THOMAS DUCKWORTH,
   WILLIAM STEVENS.